March 26, 1929. W. A. KYSOR 1,706,979
COMBINED MUFFLER AND HEATER
Filed March 7, 1927
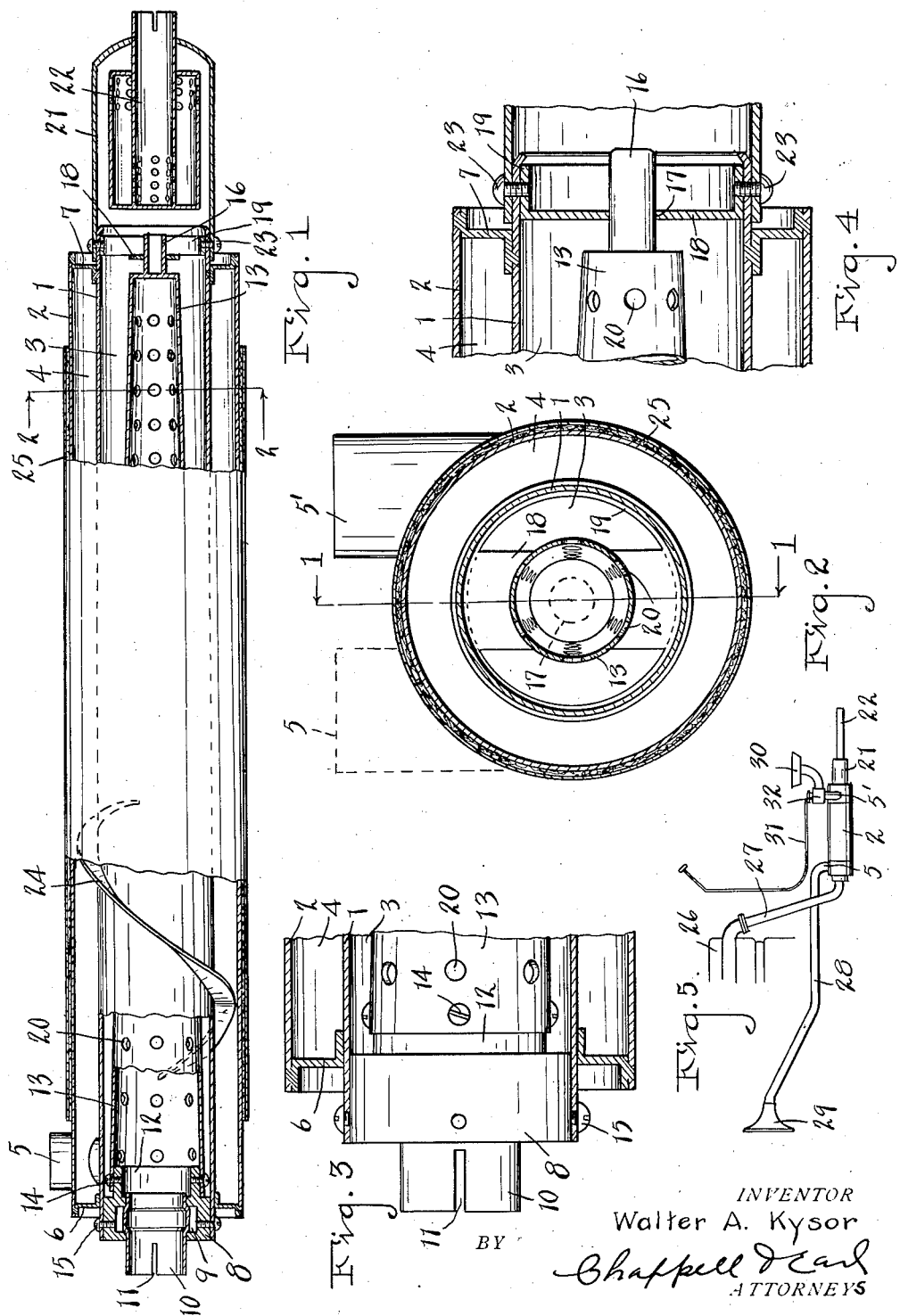
INVENTOR
Walter A. Kysor
BY Chappell & Earl
ATTORNEYS Patented Mar. 26, 1929.

1,706,979

UNITED STATES PATENT OFFICE.

WALTER A. KYSOR, OF ALLEGAN, MICHIGAN.

COMBINED MUFFLER AND HEATER.

Application filed March 7, 1927. Serial No. 173,490.

The main objects of this invention are:

First, to provide a combined muffler and heater for motor vehicles such as busses, ambulances and automobiles which is highly efficient and at the same time is comparatively simple in its parts and the parts may be quickly assembled and disassembled should occasion require.

Second, to provide a structure embodying these advantages which is very durable, the parts being arranged so that the joints are not likely to be opened by unequal expansion and contraction of the several parts.

Objects pertaining to details and economies of my invention will appear from the description to follow. The invention is defined and pointed out in the claims.

A structure embodying the features of my invention is illustrated in the accompanying drawing, forming a part of this application, in which:

Fig. 1 is a fragmentary view partially in longitudinal section on line 1—1 of Fig. 2 of a structure embodying the features of my invention.

Fig. 2 is a cross section on line 2—2 of Fig. 1.

Fig. 3 is an enlarged detail view partially in longitudinal section showing structural details and the manner of assembling.

Fig. 4 is an enlarged detail view partially in longitudinal section showing further structural details and the manner of assembling.

Fig. 5 is a diagrammatic view illustrating the manner of installing my improvements in relation to parts of a motor vehicle.

In the drawing similar reference characters refer to similar parts throughout the several views.

Referring to the drawing, the structure illustrated comprises an inner tubular wall 1 and an outer tubular wall 2. These walls are concentrically arranged providing a central elongated gas chamber 3 and a surrounding air chamber 4. The gas chamber is open at its rear end for the discharge of the gases.

The air chamber has a tangentially disposed air inlet connection 5 at its front end and a tangentially disposed air outlet connection 5' at its rear end, the purpose being to direct the air in a spiral course around the inner wall 1.

The inner wall 1 is longer than the outer wall so that its ends project beyond the front and rear outer wall, supporting collars 6 and 7 respectively. These supporting collars constitute the end walls for the air chamber.

The supporting collar 7 is secured to both walls preferably by welding. The collar 6 is secured to the outer wall by welding but slidably embraces the inner wall so that the joints are not broken by the unequal expansion and contraction of the inner and outer walls as they are heated and cooled, or subjected to unequal degrees of heat and cold.

At the forward end of the inner wall I secure an annular head member 8 accurately machined on its outside diameter so that when forced under pressure into position, it expands the inner walls slightly and brings it to an accurate size and roundness for the slidable collar 6 to move upon. The coupling head is removably secured within the forward end of the inner wall by means of the screws 15 arranged at the outside of the collar 6. This head member has an annular internal channel or groove 9 into which the inner end of the coupling nipple 10 is expanded as shown in Fig. 1, thereby securing the nipple with its end projecting so that it may be clamped upon an exhaust pipe, the nipple being longitudinally slit at 11 to facilitate such connections.

The head member has a reduced inner end or flange 12 upon which the discharge pipe 13 for heated gases is mounted. The forward end of this pipe is secured upon the head by means of screws 14. This pipe 13 is supported at its rear end by the stud 16 which engages an opening 17 in the cross member 18 of a spider, the spider having a peripheral flange 19 secured within the rear end of the inner wall. This stud slidably engages the spider to permit its being withdrawn or removed and also to permit expansion and contraction of the pipe. The pipe is preferably rearwardly tapered, as illustrated, and is of such diameter that its larger end lies close to the inner wall. The ready detachment of the head member 8 and stud 16 will permit easy disassembly for cleaning.

The pipe has a plurality of discharge orifices 20 arranged about it so that the products of combustion or heated gases are discharged therefrom in laterally directed jets against the inner wall and flow rearwardly through the gas chamber and are discharged therefrom into a discharge pipe, which may be mounted on the projecting end of the inner wall, or into the outer casing 21 of a muffler unit, designated generally by the numeral 22.

This outer casing of the muffler unit is telescoped upon the projecting end of the inner wall and secured thereto by means of the screws 23. This permits convenient assembling of the muffler unit and the removal of the muffler unit for cleaning as may be desired. The discharge pipe, if used instead of muffler section, may also be readily removed.

I preferably provide a spiral baffle 24 which is mounted upon and arranged spirally of the inner wall in operative relation to the air intake so as to insure the air taking a spiral path around the inner wall. The outer edge of this baffle member lies in close proximity to the outer wall but is not connected thereto.

In the embodiment illustrated, I provide an insulating covering 25 for the outer wall.

In Fig. 5 the numeral 26 indicates an internal combustion engine and 27 the exhaust pipe thereof. A conduit 28 with a flaring mouth 29 is provided for conducting air to the intake 5. A register 30 is connected to the discharge 5', and 31 represents the control means for the register valve 32.

Devices constructed in accordance with my improvements may be economically produced, are highly efficient and can be readily assembled and disassembled as occasion requires. The parts are arranged so that the joints are not likely to be opened in use by expansion and contraction due to heating and cooling and varying temperatures of the parts, so the structure is very durable.

I have illustrated and described my improvements in an embodiment which I have found very practical. I have not attempted to illustrate and describe certain embodiments which are possible as it is believed the disclosure made will enable those skilled in the art to embody my invention as may be desired.

Having thus described my invention what I claim as new and desire to secure by Letters Patent is:

1. In a device of the class described, the combination of concentrically disposed inner and outer tubular walls providing a central elongated gas chamber and a surrounding air chamber, said gas chamber being open at its rear end for the discharge of gases, said air chamber having air inlet and discharge openings at the respective ends thereof, an annular head member at the front end of said inner wall and having a reduced flange at its inner end and an internal annular groove, a forwardly projecting coupling nipple expanded into said groove whereby the coupling nipple is retained in position, means for securing said head member within said inner wall, a spider disposed at the rear end of said inner wall, and a foraminated discharge pipe for the heated gases mounted on said head member and provided with a supporting lug at its rear end engaging said spider.

2. In a device of the class described, the combination of concentrically disposed inner and outer tubular walls providing a central elongated gas chamber and a surrounding air chamber, said gas chamber being open at its rear end for the discharge of gases, said air chamber having air inlet and discharge openings at the respective ends thereof, said walls being arranged with the rear end of the inner wall projecting from the outer wall, a rearwardly tapered discharge pipe for the heated gases disposed centrally within said gas chamber and extending approximately from end to end thereof, said discharge pipe having a plurality of discharge openings around the same so that heated gases are discharged therefrom in laterally directed jets and flow thence rearwardly through said gas chamber around said pipe to said gas discharge opening at the rear end of said gas chamber, and a unit to which said gas chamber discharges open at its front end and having telescoping engagement with the projecting rear end of said inner wall.

3. In a device of the class described, the combination of concentrically disposed inner and outer tubular walls providing a central elongated gas chamber and a surrounding air chamber, said air chamber having tangentially disposed air inlet and discharge connections at the respective ends thereof, front and rear supporting collars embracing said inner wall and disposed within and secured to the outer wall, one of said collars having sliding engagement with one of said walls, the front collar being disposed rearwardly of the front end of the inner wall, a spiral baffle mounted on said inner wall in operative relation to said inlet, the outer edge of said baffle being adjacent to but not connected with the outer wall, a head member inserted in the front end of said inner wall, means for securing said head member within said inner wall disposed at the outside of said front wall supporting collar, a spider secured within the rear end of said inner wall, and a discharge pipe for the heated gases secured on the inwardly projecting flange of said head member for removal therewith and provided with a longitudinal supporting lug at its rear end slidably and removably engaging said spider.

4. In a device of the class described, the combination of concentrically disposed inner and outer tubular walls providing a central elongated gas chamber and a surrounding air chamber, said air chamber having air inlet and discharge openings at the respective ends thereof, front and rear supporting collars embracing said inner wall and disposed within and secured to the outer wall, one of said collars having sliding engagement with one of said walls, the front collar being disposed rearwardly of the front end of the inner wall, a head member inserted in the front end of said inner wall, means for securing said head member within said inner wall, disposed at the outside of said front wall supporting collar, a spider secured within the rear end of said inner wall, and a discharge pipe for the heated gases secured on the inwardly projecting flange of said head member for removal therewith and provided with a longitudinal supporting lug at its rear end slidably and removably engaging said spider.

5. In a device of the class described, the combination of concentrically disposed inner and outer tubular walls providing a central elongated gas chamber and a surrounding air chamber, said gas chamber being open at its rear end for the discharge of gases, said air chamber having air inlet and discharge openings at the respective ends thereof, said walls being arranged with the ends of the inner wall projecting from the outer wall, a head member inserted in the front end of said inner wall, means for securing said head member within said inner wall disposed at the outside of said outer wall, a spider secured within the rear end of said inner wall, a foraminated discharge pipe for the heated gases mounted on said head member and provided with a supporting lug at its rear end slidably and removably engaging said spider, and a muffler to which said gas chamber discharges open at its front end and having telescoping engagement with the projecting rear end of said inner wall and removably secured thereto.

In witness whereof I have hereunto set my hand.

WALTER A. KYSOR.